UNITED STATES PATENT OFFICE.

JAMES M. A. MILLER, OF SAN MATEO, ASSIGNOR TO EBEN BEAN, OF JACKSONVILLE, FLORIDA.

METHOD OF PREPARING INSECTICIDES.

SPECIFICATION forming part of Letters Patent No. 398,527, dated February 26, 1889.

Application filed May 22, 1888. Serial No. 274,689. (No specimens.)

*To all whom it may concern:*

Be it known that I, JAMES M. A. MILLER, of San Mateo, in the county of Putnam, State of Florida, have invented a new and Improved Method of Preparing Insecticides, of which the following is a full, clear, and exact description.

This invention has for its object the production of an insect-destroying compound, more particularly designed to be used upon plants and trees, especially fruit-bearing trees—such as the orange-tree and others—and which will effectually destroy different insects that infest, injure, and destroy plants, trees, and fruit-life.

The compound is made up of lime, sulphur, and water, in which the lime and sulphur are chemically united and held in solution in the water; and the invention includes the process by which this solution of lime and sulphur is produced, substantially as hereinafter described, and pointed out in the claim.

It is well known that common air-slaked lime and powdered sulphur when put into water do not unite and dissolve in the water, but settle at the bottom of the vessel containing the three ingredients—namely, lime, sulphur, and water, which remain, essentially, in their natural conditions. Such a mere mechanical mixture or combination would be valueless. I therefore do not thus prepare the mixture; but I take caustic lime or unslaked lime in the lump and slake it with a small quantity of water and while the slaking or combustion is going on put in the powdered sulphur and burn it with or by the burning or heated lime. This produces a chemical change and causes a perfect union of the lime and sulphur, so that when put into water the same will dissolve in the water and remain in solution.

This solution may be applied to the plants or trees it is designed to clear of insects by spraying or otherwise. It may be used on orange-trees to destroy the insect which causes the fruit to rust; also to destroy "scale" and other insects with which orange-trees are infested. For these purposes the strength of the solution may be varied; but I have found that two (2) pounds of sulphur to eight (8) pounds of caustic lime, when put into one hundred (100) gallons of water, will form a sufficiently-strong solution to destroy the rust-mite; and that two (2) pounds of sulphur to ten (10) pounds of the lime in one hundred (100) gallons of water answer for removing the scale and other insects from the tree.

Having thus described my invention, what I claim as new, and desire to secure by Letters Patent, is—

The within-described process of producing the within-specified insect-destroying compound or solution, especially applicable for the destruction of insects infesting, injuring, and destroying plant or tree and fruit life, and which consists in adding sulphur to lime while the latter is being slaked and afterward dissolving said ingredients in water, as set forth.

JAMES M. A. MILLER.

Witnesses:
ARTHUR L. TREISBACK,
AUGUSTUS STUDEBAKER.